United States Patent [19]
Kohmoto et al.

[11] Patent Number: 5,774,282
[45] Date of Patent: Jun. 30, 1998

[54] APPARATUS FOR ADJUSTING LENS POSITION IN FOCAL LENGTH VARIABLE LENS

[75] Inventors: Shinsuke Kohmoto; Norio Sato, both of Tokyo, Japan

[73] Assignee: Asahi Kogaku Kogyo Kabushiki Kaisha, Tokyo, Japan

[21] Appl. No.: 689,048

[22] Filed: Jul. 30, 1996

[30] Foreign Application Priority Data

Aug. 10, 1995 [JP] Japan .................................. 7-204874

[51] Int. Cl.⁶ .................................................. G02B 7/02
[52] U.S. Cl. ........................ 359/823; 359/820; 359/822; 359/695; 396/83
[58] Field of Search .................................. 359/811, 813, 359/819, 820, 822, 823, 827, 830, 695, 700; 396/83, 529

[56] References Cited

U.S. PATENT DOCUMENTS

| | | | |
|---|---|---|---|
| 3,671,108 | 6/1972 | Kilgus | 359/820 |
| 4,387,968 | 6/1983 | Sekiguchi | 359/704 |
| 4,850,674 | 7/1989 | Hasselskog | 359/820 |
| 5,144,494 | 9/1992 | Sekiguichi | 359/700 |
| 5,249,082 | 9/1993 | Newman | 359/813 |
| 5,469,300 | 11/1995 | Nomura | 359/700 |
| 5,475,457 | 12/1995 | Tanaka | 396/83 |
| 5,510,936 | 4/1996 | Aoki et al. | 359/822 |
| 5,537,262 | 7/1996 | Aoki et al. | 359/822 |

FOREIGN PATENT DOCUMENTS

| | | |
|---|---|---|
| 1524497 | 9/1978 | United Kingdom . |
| 2241084 | 8/1991 | United Kingdom . |

*Primary Examiner*—Loha Ben
*Attorney, Agent, or Firm*—Greenblum & Bernstein P.L.C.

[57] ABSTRACT

A lens position adjusting apparatus for adjusting an axial position of a rearmost lens group of a plurality of lens groups provided in a focal length variable lens upon assembly of the focal length variable lens is provided. The lens position adjusting apparatus includes a lens frame, a lens frame holder and an engagement tooth array portion. The lens frame holds the rearmost lens group. The lens frame holder engages with the lens frame through a threaded engagement. The engagement tooth array portion is formed along a rear end of the lens frame. The engagement tooth array portion consists of a plurality of engaging teeth. Each of the engaging teeth extends in a direction substantially parallel to an optical axis facing towards a rear of the focal length variable lens.

18 Claims, 9 Drawing Sheets

APPARATUS FOR ADJUSTING LENS POSITION IN FOCAL LENGTH VARIABLE LENS

BACKGROUND OF THE INVENTION

1. Field of the Invention

The present invention relates to an apparatus for adjusting an axial position of a lens element of a focal length variable lens.

2. Description of the Related Art

In recent lens-shutter cameras having a focal length variable lens (e.g., a multiple focal length lens, a zoom lens, etc., which offers a plurality of different focal lengths in one lens) incorporated therein, the axial position of a lens element(s) is adjusted (zoom adjustment) upon assembly and adjustment of the lens. There is thus no displacement of the image point during a zooming operation (variation of the focal length) after a focusing operation is effected on an object to be photographed. Generally speaking, the adjustment of the axial position of the lens element(s) is carried out by changing the relative engagement position between a lens frame, which holds the lens element, and a separate lens frame holder, which is screw-engaged with the lens frame.

If the movement of the lens element during the adjustment is large, a space large enough to permit the lens element to move must be provided in the camera. This results in an increase in the size of the camera. To prevent this, the assignee of the present application has proposed an adjusting mechanism in which the axial position of the lens is adjusted by moving the rearmost (last) lens group, closest to the image surface, in the optical axis direction, in view of the fact that the displacement of the focal position per unit movement of the rearmost lens group is larger than that of the focal position per unit movement of a lens group other than the rearmost lens group (U.S. Pat. No. 5,475,457).

In this adjusting mechanism, the lens frame which holds the rearmost lens group is provided on an outer peripheral surface thereof with a circumferential gear which can be engaged with a pinion of a tool separate from the camera, so that the rotation of the tool causes the lens frame to rotate. However, recently it has been considered that providing the circumferential gear on the lens frame is contrary to the miniaturization of the camera. To this end, there is a need to realize a small lens position adjusting mechanism.

SUMMARY OF THE INVENTION

It is an object of the present invention to provide an apparatus for adjusting an axial position of a rearmost lens group of a focal length variable lens, in which an inner space of an associated camera necessary for the movement of the rearmost lens group during the adjustment can be minimized.

To achieve the object mentioned above, according to an aspect of the present invention, there is provided a lens position adjusting apparatus for adjusting an axial position of a rearmost lens group of a plurality of lens groups provided in a focal length variable lens, upon assembly of the focal length variable lens. The lens position adjusting apparatus includes a lens frame, a lens frame holder and an engagement tooth array portion. The lens frame holds the rearmost lens group. The lens frame holder engages with the lens frame through a thread engagement. The engagement tooth array portion is formed along a rear end of the lens frame. The engagement tooth array portion consists of a plurality of engaging teeth. Each of the engaging teeth extends in a direction substantially parallel to an optical axis towards a rear of the focal length variable lens.

With this arrangement, it is no longer necessary to form the aforementioned circumferential gear on the outer peripheral surface of the lens frame. Consequently, no space for inserting the pinion of the tool is needed above the outer peripheral surface of the lens frame, thus reducing the size of the focal length variable lens.

The lens focal length variable lens may be a zoom lens.

In another aspect of the present invention, a lens position adjusting apparatus is provided having a lens frame which holds a rearmost lens group in a focal length variable lens. A lens frame holder holds the lens frame such that an axial position of the lens frame is adjustable along an optical axis with respect to the lens frame holder by rotating the lens frame relative to the lens frame holder. A plurality of engaging teeth are formed on a rear end of the lens frame. Each of the engaging teeth extends rearwardly in a direction substantially parallel with the optical axis.

Preferably, a male thread portion and a female thread portion are also provided. The male thread portion is formed on an outer periphery of the lens frame, while the female thread portion is formed on an inner periphery of the lens frame holder. The female thread portion meshes with the male thread portion.

In yet another aspect of the present invention, a lens position adjusting apparatus is provided having a lens frame, a lens frame holder and a series of engaging teeth. The lens frame holds a rearmost lens group in a focal length variable lens. A male thread is formed on an outer periphery of the lens frame. The lens frame holder holds the lens frame. A female thread is formed on an inner periphery of the lens frame holder. The female thread engages with the male thread. The series of engaging teeth are formed on a rear end of the lens frame.

Preferably, the engaging teeth are arranged at a substantially equi-angular distance in a circumferential direction of the rear end of the lens frame.

The present disclosure relates to subject matter contained in Japanese Patent Application No. 7-204874 (filed on Aug. 10, 1995) which is expressly incorporated herein by reference in its entirety.

BRIEF DESCRIPTION OF THE DRAWINGS

The present invention will be described below in detail with reference to the accompanying drawings, in which similar parts are indicated by like reference numerals, and wherein.

DESCRIPTION OF THE PREFERRED EMBODIMENTS

Figure 9:
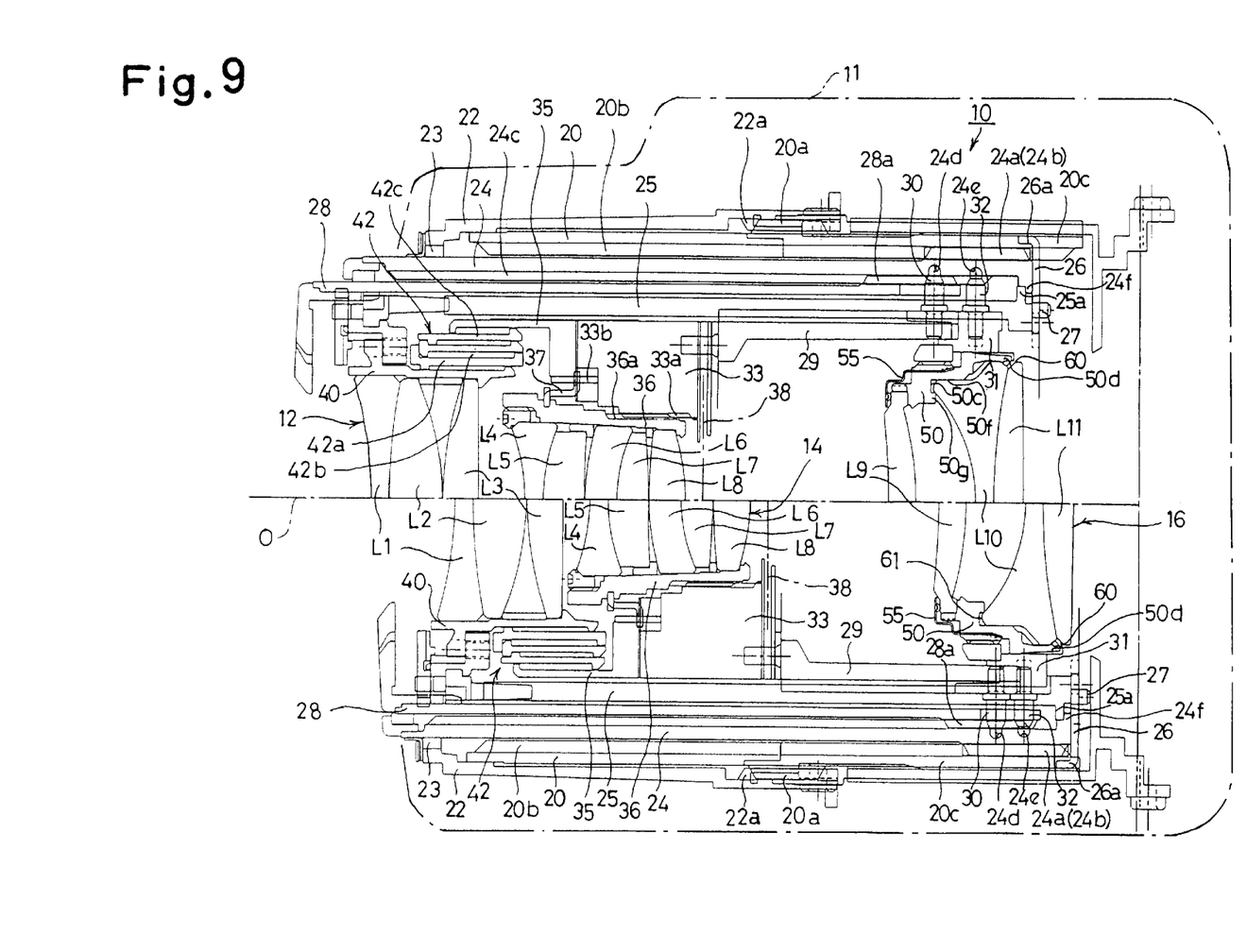

FIG. 9 shows a zoom lens barrel 10 to which a lens position adjusting apparatus according to the present invention is applied. The zoom lens barrel 10 is incorporated in a lens-shutter type of camera having a camara body 11. The lower half of FIG. 9 (the half below an optical axis O) shows the zoom lens barrel 10 in a retracted state, while the upper half of FIG. 9 (the half above the optical axis O) shows the zoom lens barrel 10 at a wide-angle end position.

The zoom lens barrel 10 is provided with three lens groups, i.e., a first lens group 12, a second lens group 14 and a third lens group (rearmost lens group) 16 in respective order from an object side. The first lens group 12 consists of first, second and third lens elements L1, L2 and L3. The second lens group 14 consists of fourth, fifth, sixth, seventh and eighth lens elements L4, L5, L6, L7, and L8. The third lens group 16 consists of ninth, tenth and eleventh lens elements L9, L10, and L11. A zooming operation is effected by moving the three lens groups 12, 14 and 16 along the optical axis O in accordance with a predetermined relationship.

A barrel block (not shown) is secured to the camera body 11. A stationary ring 20 is fitted in the barrel block so as not to rotate. The stationary ring 20 is provided on an outer peripheral surface thereof with an external thread (male helicoid) 20a which is in mesh with an internal thread (female helicoid) 22a formed on an inner peripheral surface of an adjusting ring 22. The adjusting ring 22 is provided, on a front end of an inner peripheral surface thereof, with a light intercepting member 23. The light intercepting member 23 comes into sliding contact with an outer peripheral surface of a cam ring 24.

The stationary ring 20 is provided on its inner peripheral surface with an internal thread (female helicoid) 20b which is engaged with the cam ring 24. The cam ring 24 is provided on its outer peripheral surface with an external thread (male helicoid) 24a and a spur gear 24b. The cam ring 24 is fitted in the stationary ring 20 with the male helicoid 24a meshing with the female helicoid 20b. The spur gear 24b is inclined with respect to a circumferential direction of the cam ring 24 and parallel to the direction of the lead of the male helicoid 24a. The spur gear 24b is engaged with a drive pinion (not shown) which rotates at a predetermined position. The cam ring 24 is provided on an inner peripheral surface thereof with an internal thread (female helicoid) 24c and inner cam grooves 24d and 24e. The internal thread 24c moves the first lens group 12. The inner cam grooves 24d, 24e move the second and third lens groups 14 and 16. The inner cam grooves 24d, 24e are each comprised of a plurality of circumferentially spaced grooves formed by partly cutting away the female helicoid 24c.

A linear movement guide ring 25 is fitted in the inner peripheral surface of the cam ring 24. The linear movement guide ring 25 is provided on its rear end with an outer peripheral flange 25a. The outer peripheral flange 25a abuts against an inner peripheral flange 24f of the cam ring 24. A linear movement guide plate 26 is secured to the rear end of the linear movement guide ring 25 by means of securing pins 27, so that the inner peripheral flange 24f is held between the outer peripheral flange 25a and the linear movement guide plate 26.

The linear movement guide plate 26 is provided with radial projections 26a fitted in linear movement guide grooves 20c of the stationary ring 20. Consequently, the linear movement guide ring 25 rotates freely relative to the cam ring 24 and is movable along the optical axis direction O together with the cam ring 24.

The female helicoid 24c of the cam ring 24 is engaged with an external thread (male helicoid) 28a formed on the outer peripheral surface of a first lens frame 28. The first lens group 12 is secured to the first lens frame 28. The lead of the female helicoid 24c and the lead of the male helicoid 28a are opposite to the lead of the female helicoid 20b and the lead of the male helicoid 24a.

The second lens group 14 is secured to a movable frame 29. Cam pins 30 are provided on an outer peripheral surface of the movable frame 29. The cam pins 30 are fitted in the inner cam grooves 24d of the cam ring 24.

The third lens group 16 is secured to a third lens frame 50. A lens frame supporting ring (lens frame holder) 31 holds the third lens frame 50. Cam pins 32 are provided on an outer peripheral surface of the lens frame supporting ring (lens frame holder) 31. The cam pins 32 are fitted in the inner cam grooves 24e of the cam ring 24. The linear movement guide ring 25 is provided with two linear movement guide grooves (not shown) which extend in a direction parallel with the optical axis O so that the cam pins 30 and 32 are slidably fitted in the corresponding linear movement guide grooves. Thus, the second and third lens groups 14 and 16 are moved linearly by the linear movement guide ring 25.

Figure 1:
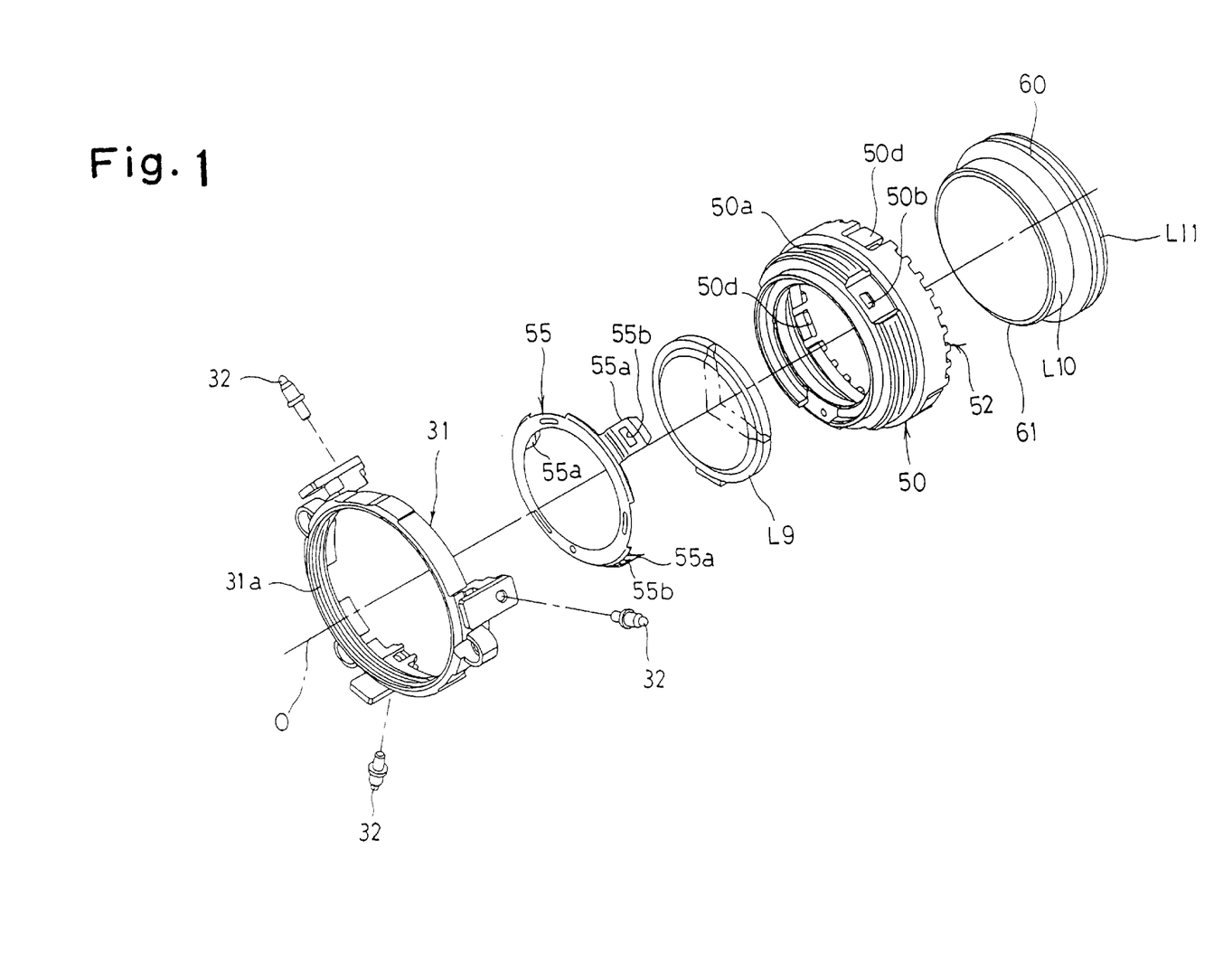
FIG. 1 is an exploded perspective view of a zoom lens barrel to which a lens position adjusting apparatus for a focal length variable lens according to the present invention is applied.
Figure 2:
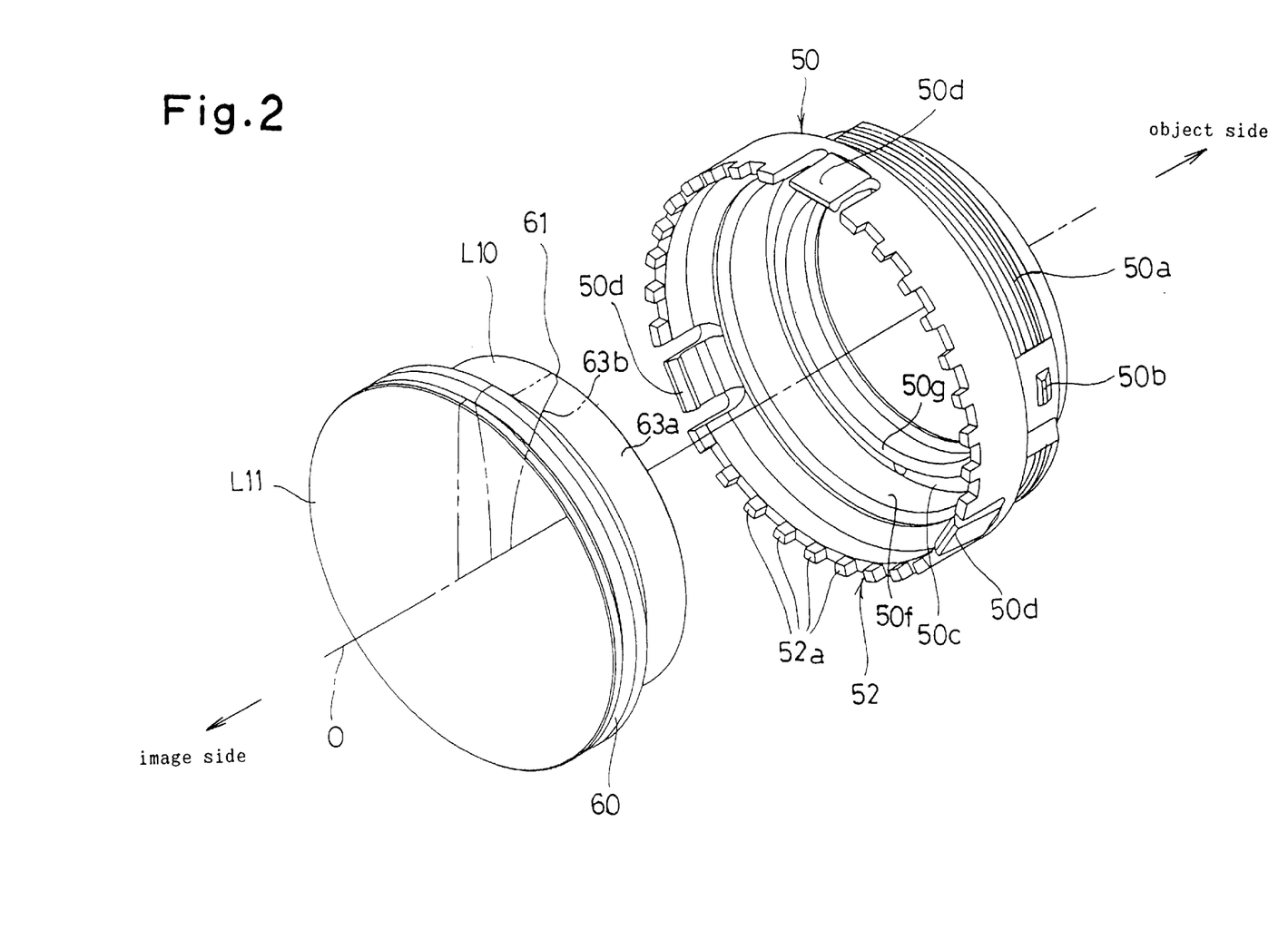
FIG. 2 is an exploded perspective view of a third lens group and a lens frame which supports the third lens group shown in FIG. 1.

As can be seen in FIG. 1, the lens frame supporting ring 31 is provided on the inner peripheral surface thereof with an internal thread 31a. The internal thread 31a meshes with an external thread 50a formed on the outer peripheral surface of the third lens frame 50. Consequently, when the third lens frame 50 is rotated about the optical axis O relative to the lens frame supporting ring 31, the axial position of the third lens frame 50 relative to the lens frame supporting ring 31 changes.

Figure 3:
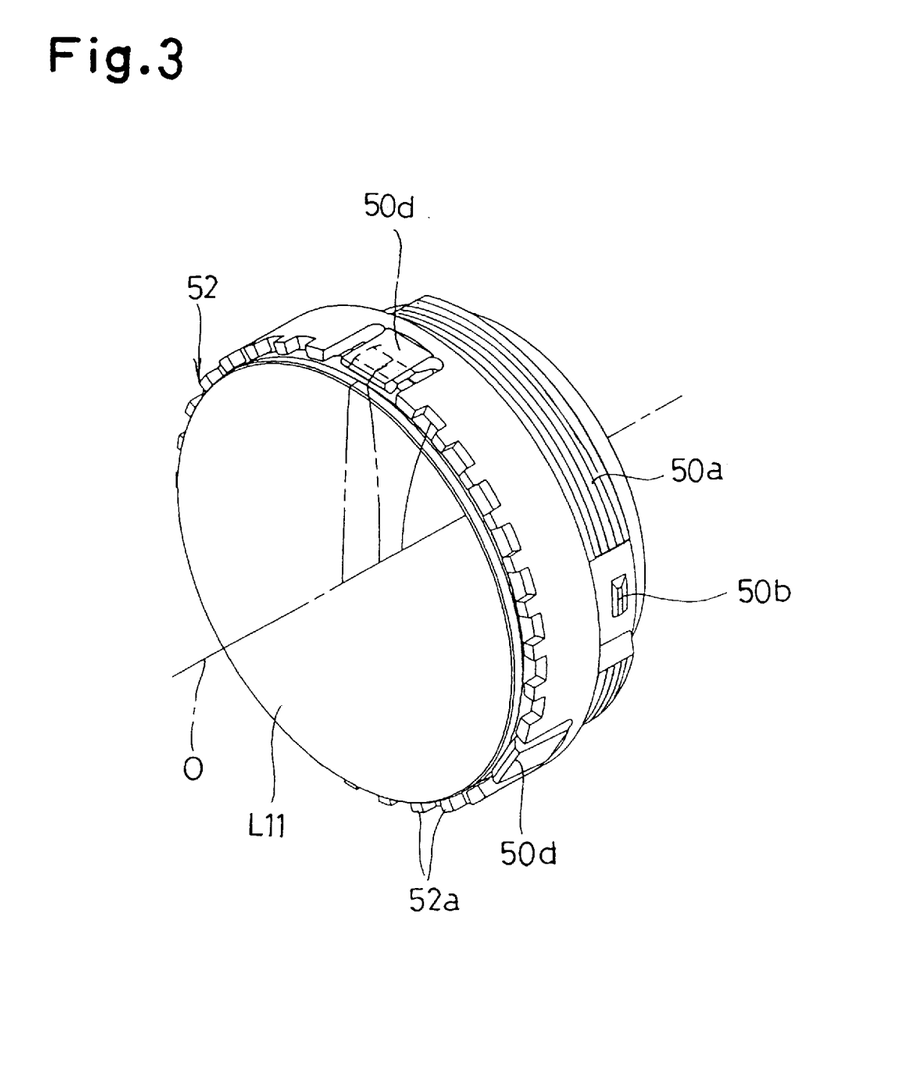
FIG. 3 is a perspective view of an assembly of the third lens group and the lens frame which supports the third lens group shown in FIG. 2.

The ninth lens L9 is secured to the front end of the third lens frame 50 through an elastically deformable annular keep plate 55. The keep plate 55 is made of a thin metal plate. The third lens frame 50 is provided on the outer peripheral surface thereof with three radially extending engagement pawls 50b, as shown in FIG. 3. The engagement pawls 50b are spaced at an equi-angular distance in the circumferential direction of the third lens frame 50. The keep plate 55 is formed with three legs 55a that extend rearward from the peripheral edge thereof. The legs 55a are spaced at an equi-angular distance in the circumferential direction of the keep plate 55. Each leg 55a is provided with an engaging hole 55b in which the corresponding engaging pawls 50b are engaged. Namely, the ninth lens group L9 is secured to the front end of the third lens frame 50 by the keep plate 55 while the engaging pawls 50b are engaged in the corresponding engaging holes 55b.

The tenth lens group L10 and the eleventh lens group L11 are secured to the inner rear end of the third lens frame 50. The tenth lens group L10 and the eleventh lens group L11 are cemented together to form a cemented lens assembly provided on an outer peripheral surface thereof with a generally V-shaped annular groove 60. The third lens frame 50 is provided on the inner peripheral surface thereof with a supporting portion 50c, which supports a front end 61 of the peripheral edge of the tenth lens group L10. Namely, the supporting portion 50c consists of a circular supporting surface 50f and a circular supporting projection 50g. The circular supporting surface 50f extends in substantially the axial direction. The circular supporting projection 50g extends towards the rear of the optical axis O (i.e., towards the right direction as viewed in FIG. 9). The circular supporting projection 50g is positioned closer to the optical axis O than the circular supporting surface 50f.

The tenth lens group L10 is held by the third lens frame 50 such that an outer peripheral surface 63a of the front portion of the tenth lens group L10 is brought into surface contact with the circular supporting surface 50f, and the peripheral edge of a front surface 63b of the tenth lens group L10 is brought into contact with the supporting projection 50g. The third lens frame 50 is provided on its rear end with three engaging pawls 50d. The engaging pawls 50d are spaced at an equi-angular distance in the circumferential direction of the third lens frame 50 and engage with the annular groove 60. Namely, the integral tenth and eleventh lens groups L10 and L11 are firmly connected to the inner rear end portion of the third lens frame 50 when (1) the outer peripheral surface 63a is brought into surface contact with the supporting surface 50f, (2) the peripheral edge of the front surface 63b abuts against the supporting projection 50g, and (3) the engaging pawls 50d are engaged in the annular groove 60.

The rear end of the third lens frame 50 is provided with an engagement tooth array 52. The engagement tooth array 52 consists of a plurality of engaging teeth 52a that extend rearwardly in a direction substantially parallel with the optical axis O, and are spaced at a substantially equi-pitch in the circumferential direction, except for the portion of the rear end of the third lens frame 50 that is provided with the engaging pawls 50d. Namely, the engaging teeth 52a are provided at a substantially equi-pitch on the portion of the end periphery of the third lens frame 50 other than the portion thereof on which the engaging pawls 50d are formed.

Figure 5:
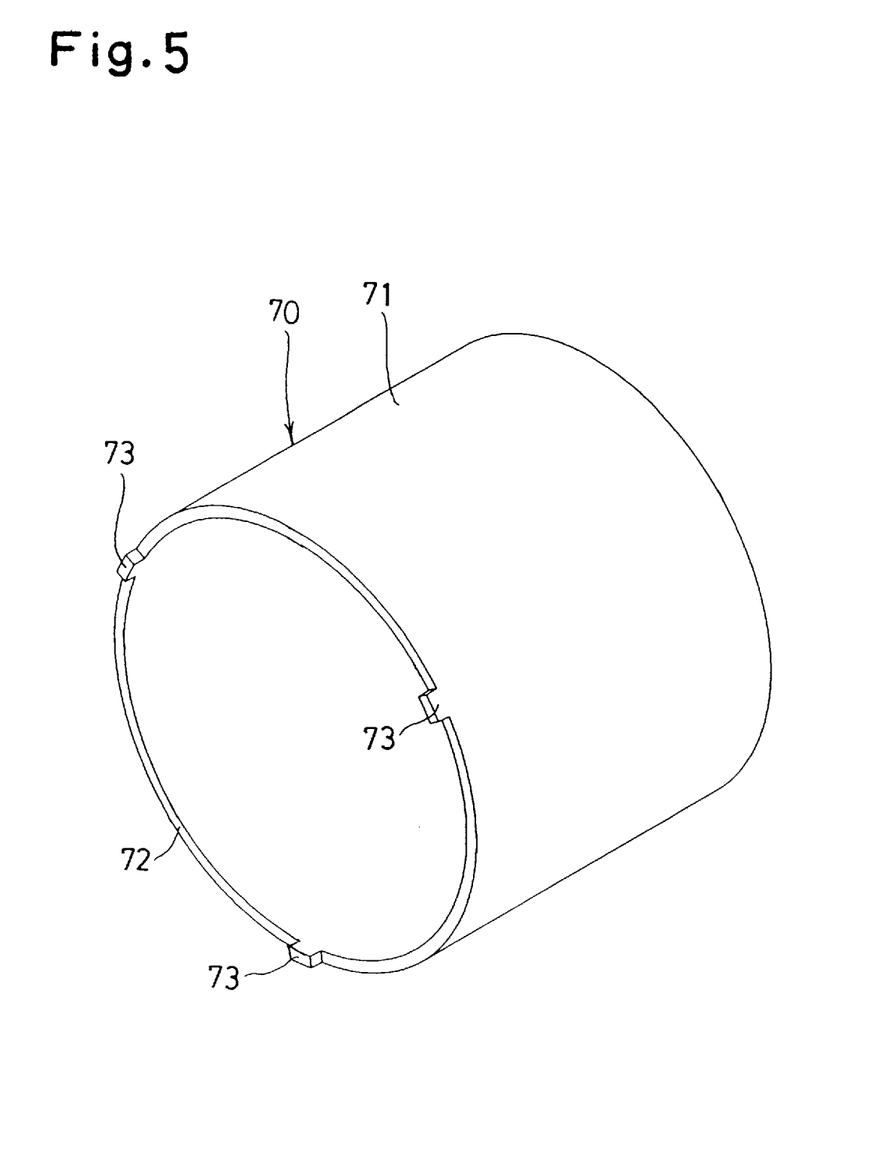
FIG. 5 is a perspective view of a tool which can be engaged with a lens frame during the zoom adjustment.

The engagement tooth array 52 can be engaged with a special tool 70 (FIG. 5) which is inserted from outside the camera. The tool 70 consists of a cylindrical portion 71 and three engaging projections 73 which are provided on one end 72 of the cylindrical portion 71. The three engaging projections 73 are spaced at an equi-angular distance in the circumferential direction of the cylindrical portion 71 Each of the engaging projections 73 can be engaged in a groove defined between and by two adjacent engaging teeth 52a of the engagement tooth array 52.

Figure 4:
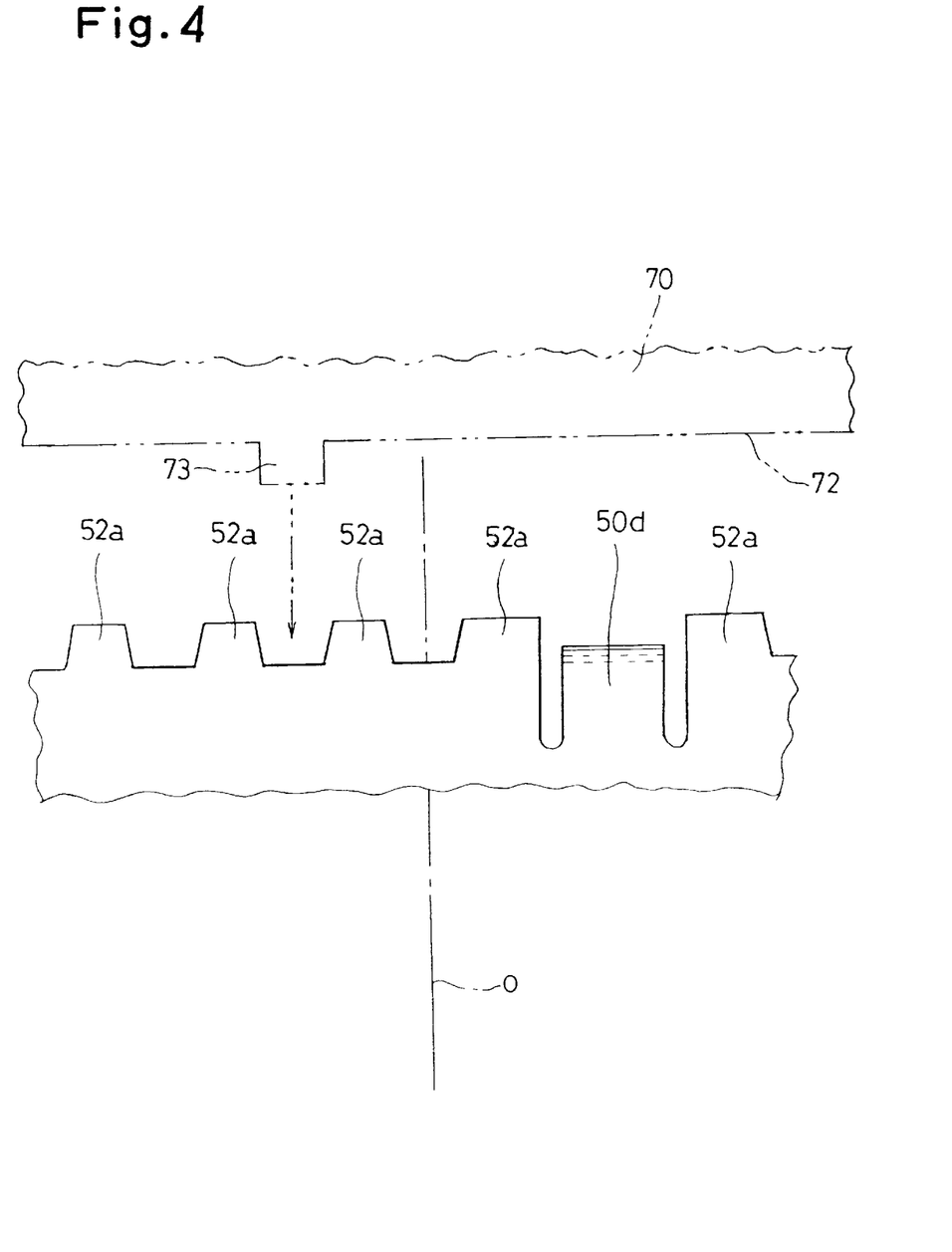
FIG. 4 is an enlarged developed view of a part of the lens frame shown in FIG. 3.

The tool 70 rotates the third lens frame 50 with respect to the lens frame supporting ring 31 to adjust the axial position of the third lens group 16 during the zoom adjustment after the lens is focused on an object to be photographed. As can be seen in FIG. 4, each of the engaging teeth 52a has a width which gradually decreases toward the rear end (outer end) thereof (in the upward direction in FIG. 4). Namely, the engaging teeth 52a are tapered toward the rear ends, so that the engaging projections 73 of the tool 70 can easily and smoothly engage with the engagement tooth array 52. In FIG. 4, the tool 70, indicated by a phantom line, is shown in a position immediately before engagement thereof in a groove defined between two adjacent teeth 52a.

Figure 6:
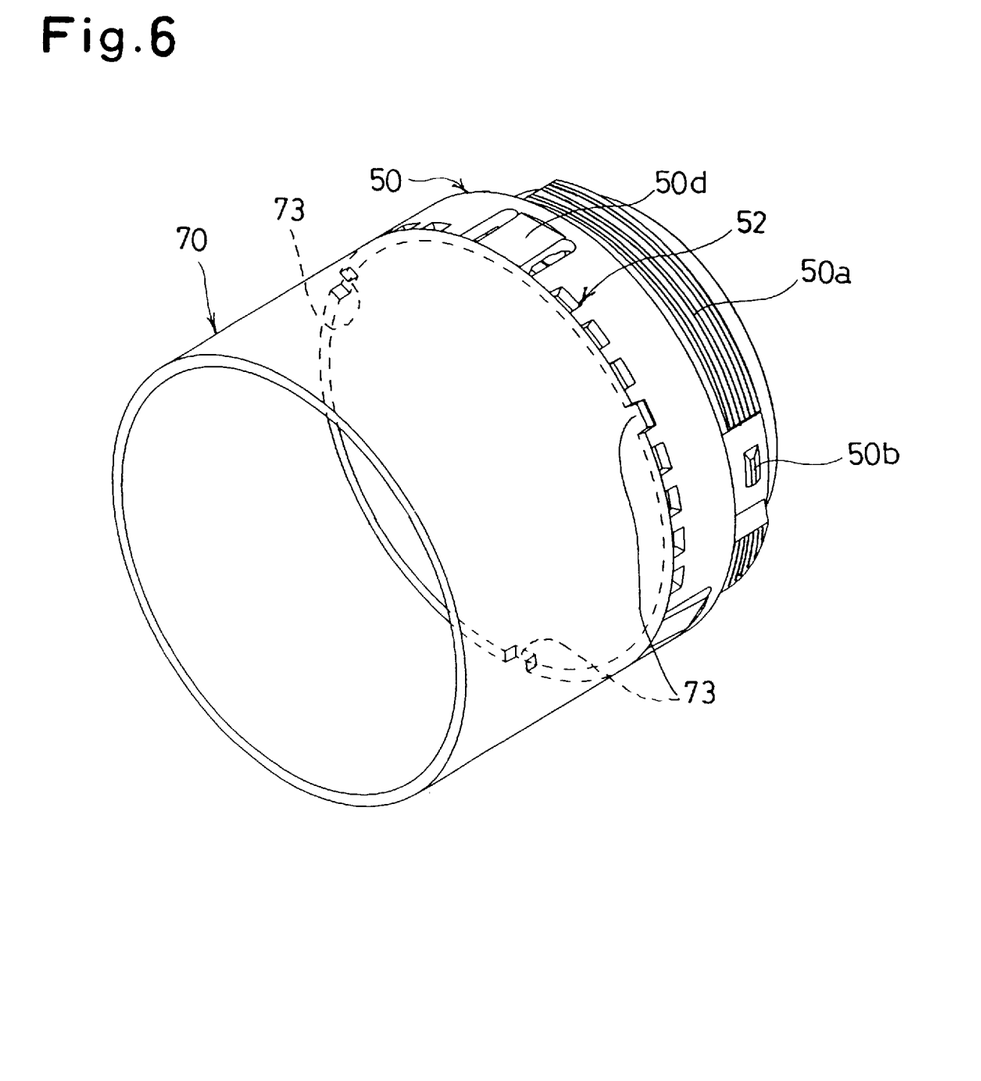
FIG. 6 is an exploded perspective view of a tool and a lens frame shown in a disengaged state.
Figure 7:
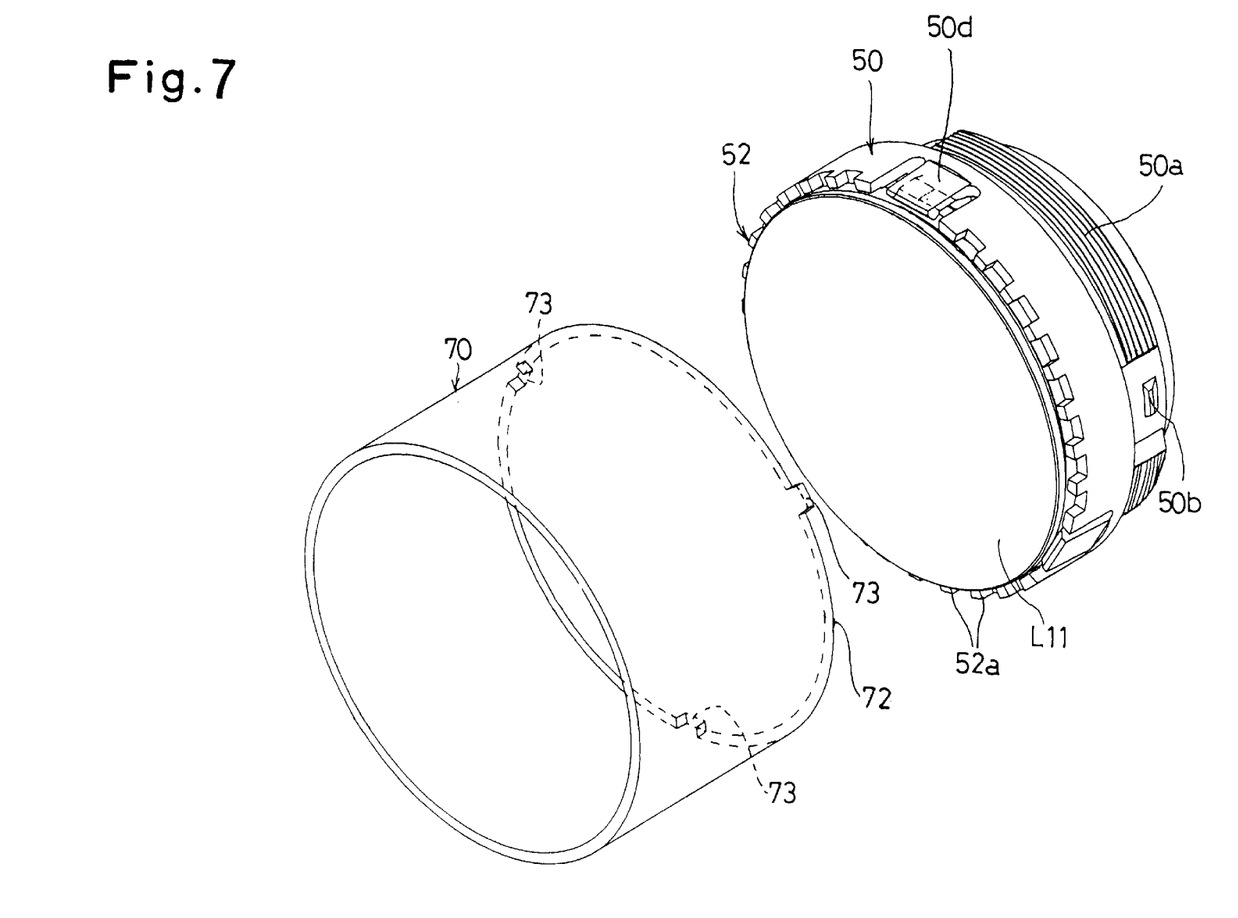
FIG. 7 is a perspective view of a tool and a lens frame shown in an engaged state.

FIG. 6 shows a disengagement position (or pre-engagement position) of the tool 70, in which the tool 70 is disengaged from the third lens frame 50 (or is being moved towards an engagement position). FIG. 7 shows an engagement position of the tool 70, in which the tool 70 is engaged with the third lens frame 50. The third lens frame 50, the lens frame supporting ring 31, and the engagement tooth array 52, etc., constitute a lens position adjusting apparatus.

An AF/AE unit 33 (FIG. 9), per se known, is secured to the front end of the movable frame 29 for moving the second lens group 14. A movable light intercepting ring 35 is secured to the front end of the AF/AE unit 33. The AF/AE unit 33 is provided on an inner peripheral surface thereof with an internal thread (female helicoid) 33a which meshes with an external thread (male helicoid) 36a provided on the outer peripheral surface of a second lens frame 36. The second lens frame 36 supports the second lens group 14.

The AF/AE unit 33 is provided with a drive pin 33b which is driven in the circumferential direction by an angular displacement determined in accordance with object distance data. The drive pin 33b is engaged with an association arm 37 which projects outward in the radial direction of the second lens frame 36. Consequently, the second lens frame 36, and accordingly the second lens group 14, are moved in the optical axis direction O in accordance with the angular displacement of the drive pin 33b and the leads of the helicoids 33a and 36a to carry out a focusing operation. Also, the AF/AE unit 33 opens and closes shutter blades 38 in accordance with object brightness data (luminance data).

The first lens frame 28 is provided on the inner peripheral surface thereof with a linear movement guide key (not shown). The linear movement guide key is slidably fitted in a linear movement guide groove (not shown) formed on the outer peripheral surface of the linear movement guide ring 25. Thus, the first lens frame 28 and the first lens group 12 are moved linearly by the linear movement guide ring 25 in accordance with the engagement between the linear movement guide key and the linear movement guide groove.

A supporting cylinder 40 is secured in the first lens frame 28 to directly support the first lens group 12. A light intercepting portion 42 is provided between the supporting cylinder 40 and the movable light intercepting ring 35. The light intercepting portion 42 intercepts light which would otherwise enter a space between the supporting cylinder 40 and the light intercepting ring 35. The light intercepting portion 42 consists of first, second and third light intercepting rings 42a, 42b and 42c, which are concentrically arranged and are supported by the first lens frame 28 and the movable light intercepting ring 35 to relatively move in the optical axis direction O.

In the zoom lens barrel 10 to which the present invention is applied, the zoom adjustment is carried out as follows.

The engagement tooth array 52, formed on the rear end edge of the third lens frame 50, is engaged with the tool 70. When the tool 70 is rotates, the third lens frame 50 rotates with respect to the lens frame supporting ring 31. Consequently, the axial position of the third lens group 16 is adjusted in accordance with the external thread 50a and the internal thread 31a. In the prior art, for example, the lens frame which supports the third lens group 16 is provided on the outer peripheral surface thereof with a circumferential gear which can be engaged with a pinion of a tool, so that the rotation of the tool causes the lens frame to rotate to adjust the axial position of the lens.

In the zoom lens barrel 10 according to the present invention, it is not necessary to provide the circumferential gear on the outer peripheral surface of the lens frame (third lens frame 50) which supports the third lens group 16.

Moreover, no space for inserting the pinion of the tool is needed above the outer peripheral surface of the lens frame, thus resulting in a miniaturization of the zoom lens barrel. Furthermore, the tool 70 can be easily engaged with the engagement tooth array 52 at any of a number of angular positions since the engaging teeth 52a of a great number are formed at regular intervals on the rear end of the third lens frame 50.

The zoom lens barrel as constructed above operates as follows.

If the drive pinion (not shown), which meshes with the spur gear 24b of the cam ring 24, is rotated by a motor (not shown) towards the wide angle position (upper half of FIG. 9), the cam ring 24 is moved in the optical axis direction while rotating, via engagement between the male helicoid 24a and the female helicoid 20b. Consequently, the first lens frame 28, is further advanced in the optical axis direction with respect to the cam ring 24 via the opposite leads of the male helicoid 28a and the female helicoid 24c. Similarly, the movable frame 29 and the lens frame supporting ring 31 advance in the optical axis direction O by the rotation of the cam ring 24 in accordance with the profiles of the cam grooves 24d and 24e. This performs the zooming operation, since the cam pins 30 and 32 of the movable frame 29 and the lens frame supporting ring 31 are engaged in the cam grooves 24d and 24e of the cam ring 24, respectively.

Although the tenth lens group L10 and the eleventh lens group L11 (integral therewith) are held by the third lens frame 50 through the engaging pawls 50d in the illustrated embodiment, it is possible to secure the integral tenth and eleventh lens groups L10 and L11 to the third lens frame 50 by means of an adhesive or the like without providing the engaging pawls 50d on the third lens frame 50. In this case, it is also possible to provide the plurality of engaging teeth 52a which constitute the engagement tooth array portion 52, on the entirety of the rear end surface of the third lens frame 50 at a substantially equi-pitch in the circumferential direction.

Moreover, although the tool 70 is provided on one end 72 with three projections 73 in the above-mentioned embodiment, the number of projections 73 is not limited to three and can be two or more than three.

Figure 8:
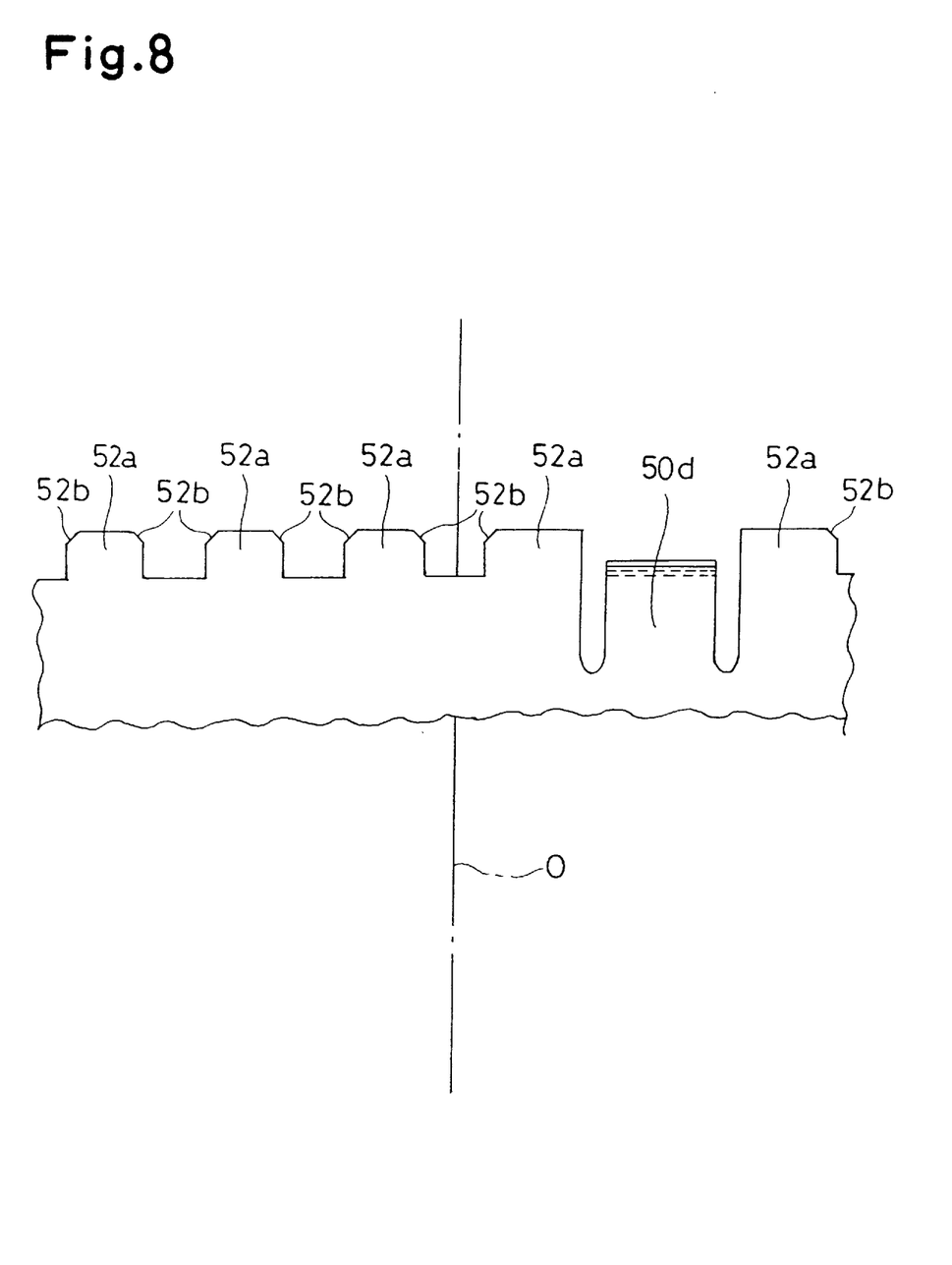
FIG. 8 is an enlarged developed view of engaging teeth of a lens frame according to another embodiment of the present invention; and, FIG. 9 is a longitudinal sectional view of a zoom lens barrel to which a lens position adjusting apparatus is applied according to the present invention.

Furthermore, although the engaging teeth 52a are tapered to reduce the width thereof in the backward direction of the optical axis to ensure a smooth engagement between the engaging projections 73 of the tool 70 and the engagement tooth array portion 52, in the illustrated embodiment, it is possible to provide chamfered edges 52b on the rear end of each engaging tooth 52a, as shown in FIG. 8. The chamfered edges 52b contribute to a smooth engagement between the projections 73 of the tool 70 and the recesses defined between the adjacent engaging teeth 52a, as in the arrangement shown in FIG. 4.

As may be understood from the above discussion, according to the present invention, since a lens position adjusting apparatus is provided for adjusting an axial position of a rearmost lens group of a plurality of lens groups provided in a focal length variable lens, upon assembly of the focal length variable lens, the lens position adjusting apparatus having a lens frame which holds the rearmost lens group, a lens frame holder which engages with the lens frame through a thread engagement, and an engagement tooth array portion formed along a rear end of the lens frame, the engagement tooth array portion having a plurality of engaging teeth, each of the engaging teeth extending in a direction substantially parallel to an optical axis towards a rear of the focal length variable lens, the inner space of the lens adjusting apparatus can be reduced, thus resulting in a realization of a small camera.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens position adjusting apparatus for adjusting an axial position of a lens in a focal length variable lens, comprising:
    a plurality of lens groups, including a rearmost lens group:
    a lens frame which holds said rearmost lens group;
    a lens frame holder which engages with said lens frame through a threaded engagement; and
    an engagement tooth array portion, formed along a rear end of said lens frame, said engagement tooth array portion comprising a plurality of engaging teeth, each extending in a direction substantially parallel to an optical axis and facing towards a rear of said focal length variable lens.

2. The lens position adjusting apparatus according to claim 1, wherein said focal length variable lens is a zoom lens.

3. The lens position adjusting apparatus according to claim 1, wherein said lens frame holder moves along said optical axis without rotating about said optical axis when a focal length of said focal length variable lens is varied.

4. The lens position adjusting apparatus according to claim 1, wherein said lens frame is rotatable relative to said lens frame holder about said optical axis.

5. The lens position adjusting apparatus according to claim 4, wherein said lens frame can be rotated by a rotation of a tool, said tool being provided with at least two engaging projections which can engage with said plurality of engaging teeth.

6. The lens position adjusting apparatus according to claim 1, wherein said each of said plurality of engaging teeth is provided with a tapered end, and wherein a width of said tapered end gradually decreases in said direction towards said rear of said focal length variable lens.

7. The lens position adjusting apparatus according to claim 1, wherein said each of said plurality of engaging teeth is provided with a chamfered end.

8. The lens position adjusting apparatus according to claim 1, wherein said engaging teeth are arranged substantially equidistant along a circumference of said rear end of said lens frame.

9. The lens position adjusting apparatus according to claim 1, further comprising a camera in which said lens frame holder is received.

10. The apparatus of claim 1, wherein said lens position adjusting apparatus adjusts an axial position of said rearmost lens group upon assembly.

11. A lens frame adjusting apparatus for adjusting an axial position of a lens in a focal length variable lens, comprising:
    a plurality of lens groups, including a rearmost lens group;
    a lens frame which holds said rearmost lens group in a focal length variable lens;
    a lens frame holder which holds said lens frame such that an axial position of said lens frame is adjustable along an optical axis with respect to said lens frame holder by rotating said lens frame relative to said lens frame holder; and a plurality of engaging teeth, formed on a rear end of said lens frame, each extending rearwardly in a direction substantially parallel with said optical axis.

12. The lens position adjusting apparatus according to claim 11, further comprising:

a male thread formed on an outer periphery of said lens frame; and a female thread formed on an inner periphery of said lens frame holder, said female thread meshing with said male thread.

13. The lens position adjusting apparatus according to claim 11, wherein said lens frame holder is guided along said optical axis without rotating about said optical axis.

14. The lens position adjusting apparatus according to claim 11, wherein said focal length variable lens comprises first, second and third lens groups in respective order from an object side, said rearmost lens group being said third lens group.

15. The lens position adjusting apparatus according to claim 11, wherein said rearmost lens group comprises front and rear lens elements, said front lens element being fixed to said lens frame through a ring member engaging with said lens frame, and said rear lens element being fixed to said lens frame through an engaging pawl formed integrally with said lens frame.

16. The lens position adjusting apparatus according to claim 11, further comprising an adjusting tool comprising at least two engaging projections formed at regular intervals on said adjusting tool, a number of said plurality of engaging teeth being larger than a number of said at least two engaging projections.

17. A lens positioning adjusting apparatus, comprising:

a plurality of lens groups, including a rearmost lens group;

a lens frame which holds said rearmost lens group in a focal length variable lens, a male thread being formed on an outer periphery of said lens frame;

a lens frame holder for holding said lens frame, a female thread being formed on an inner periphery of said lens frame holder, said female thread engaging with said male thread, and a series of engaging teeth formed on a rear end of said lens frame, said engaging teeth, said male thread and said female thread comprising an adjustment mechanism for adjusting an axial position of said rearmost lens group.

18. The lens position adjusting apparatus according to claim 17, wherein said series of engaging teeth are arranged substantially equidistantly spaced along a circumference of said rear end of said lens frame.

\* \* \* \* \*